US009846768B2

(12) United States Patent
Nesbitt et al.

(10) Patent No.: US 9,846,768 B2
(45) Date of Patent: Dec. 19, 2017

(54) RELATING CODE WITH INTELLECTUAL PROPERTY ASSETS

(75) Inventors: Pamela Ann Nesbitt, Tampa, FL (US); Lisa M Chavez, Tucson, AZ (US); Michael John Spisak, East Northport, NY (US); David Bruce Kumhyr, Austin, TX (US); Rhonda L Childress, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2396 days.

(21) Appl. No.: 12/273,632

(22) Filed: Nov. 19, 2008

(65) Prior Publication Data
US 2010/0125472 A1 May 20, 2010

(51) Int. Cl.
G06F 21/00 (2013.01)
G06F 21/10 (2013.01)
G06Q 10/10 (2012.01)
G06Q 50/18 (2012.01)

(52) U.S. Cl.
CPC ........... *G06F 21/105* (2013.01); *G06Q 10/10* (2013.01); *G06Q 50/18* (2013.01)

(58) Field of Classification Search
None
See application file for complete search history.

(56) References Cited

U.S. PATENT DOCUMENTS

2004/0163079 A1 8/2004 Noy et al.
2004/0268316 A1 12/2004 Fisher et al.
2005/0273432 A1* 12/2005 Stefik et al. .................... 705/52
2007/0006152 A1 1/2007 Ahmed et al.
2007/0277157 A1 11/2007 DeWitt et al.
(Continued)

FOREIGN PATENT DOCUMENTS

DE 10318489 A1 * 11/2004 ............ G06F 21/10

OTHER PUBLICATIONS

Under Secretary of Defense for Acquisition, Technology and Logistics Intellectual Property: Navigating Through Commercial Waters Issues and Solutions When Negotiating Intellectual Property With Commercial Companies. Version 1.1 (Oct. 15, 2001). Retrieved online Aug. 2, 2017.*

*Primary Examiner* — James A Reagan
(74) *Attorney, Agent, or Firm* — Garg Law Firm, PLLC; Rakesh Garg; Jeffrey S. LaBaw

(57) ABSTRACT

A method, system, and computer usable program product for relating code with intellectual property assets are provided in the illustrative embodiments. An intellectual property asset is identified. A portion of code is located from an entire code of a software application, such that the portion of code corresponds to the intellectual property asset. The portion of code is marked with information identifying the intellectual property asset. The portion of the code is executed during the execution of the software application. The execution of the portion of code is recorded, the recording indicating a use of the intellectual property asset. Additionally, a set of analysis control factors may be accepted. The recording may be analyzed according to the set of analysis control factors. A recommendation for an intellectual property asset related business decision to develop, invest in, or maintain certain intellectual property assets may be produced.

17 Claims, 5 Drawing Sheets

(56) References Cited

U.S. PATENT DOCUMENTS

2008/0028378 A1 1/2008 Biswas et al.
2009/0069913 A1* 3/2009 Stefik ................ G06F 17/30761
  700/94

* cited by examiner

FIG. 5

```
import com.ibm.it.rome.xsim.ITLMApplicationToolkit;
import com.ibm.it.rome.xsim.ITLMApplicationLicense;
[...]
public void initializeStuff () {
/* Initialize the toolkit*/
ITLMApplicationToolkit applicationToolkit = new
ITLMApplicationToolkit("itlm.trace", "itlm.log",
ITLMApplicationToolkit.ITLM_TRACE_MIN);
[...]
}
/**
* Return the day # on which the given month starts.
* Days are counted from the Hijri epoch, origin 0.
*
* @param year The hijri year
* @param year The hijri month, 0-based
*/
private long monthStart(int year, int month) {
if (civil) {
return (long)Math.ceil(29.5*month)
+ (year-1)*354 + (long)Math.floor((3+11*year)/30.0);
} else {
return trueMonthStart(12*(year-1) + month);
}
}
/**
* Return the length (in days) of the given month.
*
* @param year The hijri year
* @param year The hijri month, 0-based
* @IP_Flag_disclosure
* <att name="disclosure" value="AUS819980249"/>
* <att name="disclosure_date" value="09-Apr-98"/>
* <att name="application" value="AUS919980171US1"/>
* <att name="application_date" value="10-Sep-98"/>
* <att name="patent" value="6,111,572"/>
* <att name="patent_date" value="29-Aug-00"/>
* <att name="title" value="Runtime locale-Sensitive Switching of
Calendars in a Distributed Computer Enterprise Environment"/>
* <att name="inventor" value="Kumhyr"/>
* <att name="inventor" value="Hetherington"/>
* <att name="inventor" value="Blair"/>
*/
private final int monthLength(int year, int month)
{
/* Perform the license request when the segment is starting*/
byte productID[] = {(byte)0x00, (byte)0x11, (byte)0x22,
(byte)0x33, (byte)0x44, (byte)0x55, (byte)0x66, (byte)0x77};
byte versionID[] = = {(byte)0x00, (byte)0x22, (byte)0x44,
(byte)0x66, (byte)0x88, (byte)0xAA, (byte)0xCC, (byte)0xEE};
byte featureID[] = {(byte)0x00, (byte)0x22, (byte)0x44,
(byte)0x66, (byte)0x88, (byte)0xAA, (byte)0xCC, (byte)0xEE};
byte patentID[] = {(byte)0x00, (byte)0x22, (byte)0x44,
(byte)0x66, (byte)0x88, (byte)0xAA, (byte)0xCC, (byte)0xBB};
ITLMApplicationLicense license =
applicationToolkit.requestLicense(IBM_PUBLISHER_UUID,
productID, versionID, featureID,patented, null);

/* Check the status of the license that has been granted */
int status = license.getStatus();
Main Idea for Disclosure AUS8-2007-1384 - continued
Page 4 Printed 05/09/2008 at 11:03:20 AM
int length = 0;
if (civil) {
length = 29 + (month+1) % 2;
if (month == DHU_AL_HIJJAH && civilLeapYear(year)) {
length++;
}
} else {
month = 12*(year-1) + month;
length = (int)( trueMonthStart(month+1) - trueMonthStart(month)
);
}
/* Release the license when the segment is exiting */
license.release();
return length;
}
/* @IP_Flag_disclosure_end
*/
```

508 — import block through initializeStuff
504 — @IP_Flag_disclosure attribute block
502 — private final int monthLength
506 — license request block
510 — license status/release block
500

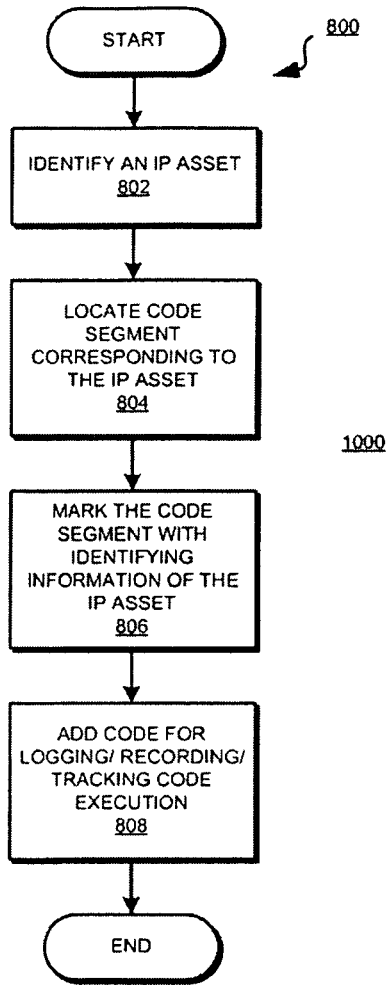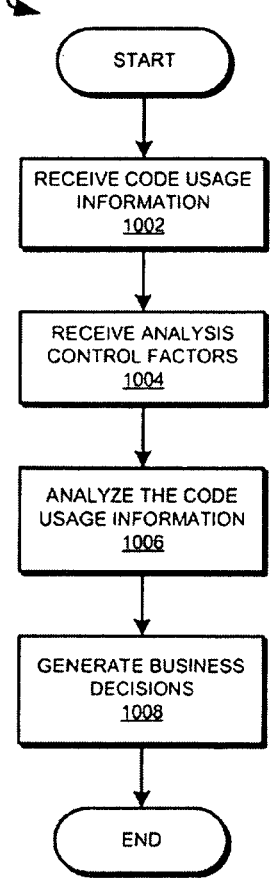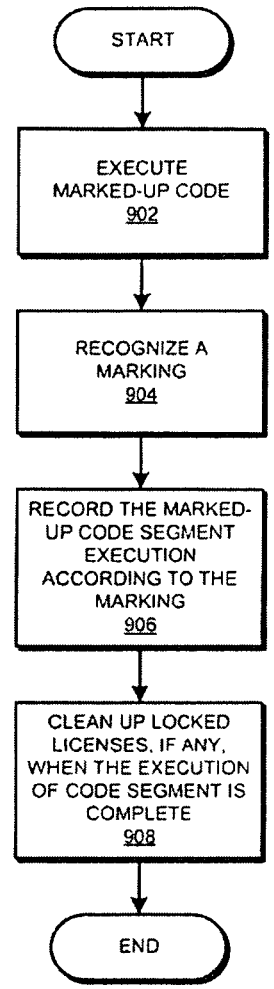

US 9,846,768 B2

RELATING CODE WITH INTELLECTUAL PROPERTY ASSETS

BACKGROUND OF THE INVENTION

1. Field of the Invention

The present invention relates generally to an improved data processing system, and in particular, to a computer implemented method for detecting intellectual property use. Still more particularly, the present invention relates to a computer implemented method, system, and computer usable program code for relating program code with intellectual property (IP) assets.

2. Description of the Related Art

Software applications and components thereof often are protected by intellectual property assets. For example, a software application may be protected by a dozen different patents, as well as copyrights, and trade secrets.

A user interested in using a software application that is protected by one or more IP assets has to license those IP assets before using the application. In many cases, the necessary licenses are packaged with the computer usable medium that includes the application, and the user need not do much more than simply use the medium to acquire the licenses.

In other cases, many licensing configurations may be associated with an application depending on the nature of the use of the application. For example, a corporation may procure an application with licenses for one hundred seats. Per seat licensing allows the licensed number of instances of the application to execute concurrently at the maximum. In some other instances, licensing can be restricted to specific data processing systems and number of processors.

SUMMARY OF THE INVENTION

The illustrative embodiments provide a method, system, and computer usable program product for relating code with intellectual property assets. An intellectual property asset is identified. A portion of code is located from an entire code of a software application, such that the portion of code corresponds to the intellectual property asset. The portion of code is marked with information identifying the intellectual property asset.

The portion of the code is executed during the execution of the software application. The execution of the portion of code is recorded, the recording indicating a use of the intellectual property asset.

The software application may be a component of a second software application. The portion of the code may be a single portion or several portions of the same or different source codes. The information identifying the intellectual property asset may include an intellectual property asset identifier and a validity period of the intellectual property asset.

The recording may include logging the execution of the portion of code the logging including the information identifying the intellectual property asset. The recording may additionally or alternatively include locking a license at the beginning of the execution of the portion of code, releasing the license at the conclusion of the execution, and logging a use of the license, the logging including the information identifying the intellectual property asset. The recording may include recording the information identifying the intellectual property asset.

Additionally, a set of analysis control factors may be accepted. The recording may be analyzed according to the set of analysis control factors. A recommendation for an intellectual property asset related business decision may be produced. The business decision may be a decision to invest in developing the technology related to the intellectual property asset, a decision to invest in maintaining the intellectual property asset, to negotiate licensing terms for licensing the intellectual property asset based on the number of executions of the portion of code, or a combination thereof.

Furthermore, the marking associated with the portion of code may be modified. The modification may include information identifying a second intellectual property asset associated with the portion of code.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 5 depicts a sample code including an example of IP markings in accordance with an illustrative embodiment;

FIG. 8 depicts a flowchart of a process of marking code segments associated with IP assets in accordance with an illustrative embodiment;

FIG. 9 depicts a flowchart of a process of detecting an IP asset usage in accordance with an illustrative embodiment;

FIG. 10 depicts a flowchart of a process of analyzing IP asset usage in accordance with an illustrative embodiment;

DETAILED DESCRIPTION OF THE PREFERRED EMBODIMENT

Figure 1:
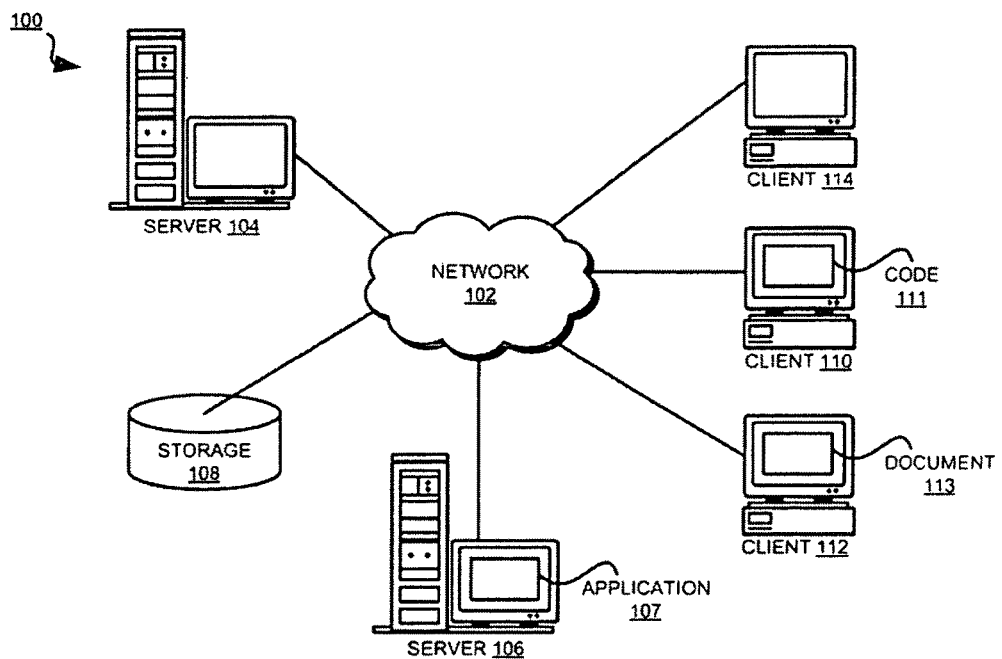
FIG. 1 depicts a pictorial representation of a network of data processing systems in which illustrative embodiments may be implemented.

The illustrative embodiments recognize that regardless of the particular licensing method employed, the IP asset owner must license, and a prospective user must acquire licenses to all IP assets associated with the software application. Further, typically, the necessary licenses presently must be negotiated prior to using the product that includes the application.

The illustrative embodiments also recognize that current licensing tools, such as license managers or license management applications, report on the use of a product as a whole. Presently, once a bundle of IP assets is associated with a product, an IP asset owner has to license and price the entire bundle of IP assets, and a user must acquire the entire bundle of licenses.

The illustrative embodiments further recognize that while several IP assets may be related to an application, each of those IP assets may contribute different values to the product. The illustrative embodiments recognize that because an IP asset that protects only certain features of a product, a license to that IP asset may be more valuable to a user who uses those features. Conversely, the same license may have little or no value to another user who is concerned with a different feature of the product.

Furthermore, a code that corresponds to a licensed feature may never execute in a given configuration. Conversely, the same code may execute more than a threshold number of times in another configuration. In either situations, licensing a bundle of licenses in a pre-determined manner may not be efficient for the licensee, the licensor, or both.

To address these and other related problems, the illustrative embodiments provide a method, computer usable program product, and data processing system relate portions of program code with particular IP assets. Using the illustrative embodiments, licensing value of particular portions of code can be measured by the number of executions of that code.

For example, a certain method or function may be an implementation of a particular claim of a particular patent. Certain markings according to the illustrative embodiments and containing the information about the associated IP asset can be incorporated in the function. When the function is executed, the code for the markings can monitor, log, and report the function execution.

Many business decisions can be made based on such information generated by the code markings. For example, a licensing negotiation for a new term can be based on such information. As another example, such information can also inform a decision whether or not to investment in new development of IP that advances the functionality of the marked portions of code. As another example, such information may allow an IP professional to decide to avoid paying patent maintenance fees for patents whose features are not being executed in a product. Many other business decisions can be informed by such information produced by the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing environments only as an example for the clarity of the description. The illustrative embodiments may be used in conjunction with other comparable or similarly purposed architectures for using virtualized real memory and managing virtual machines.

Figure 2:
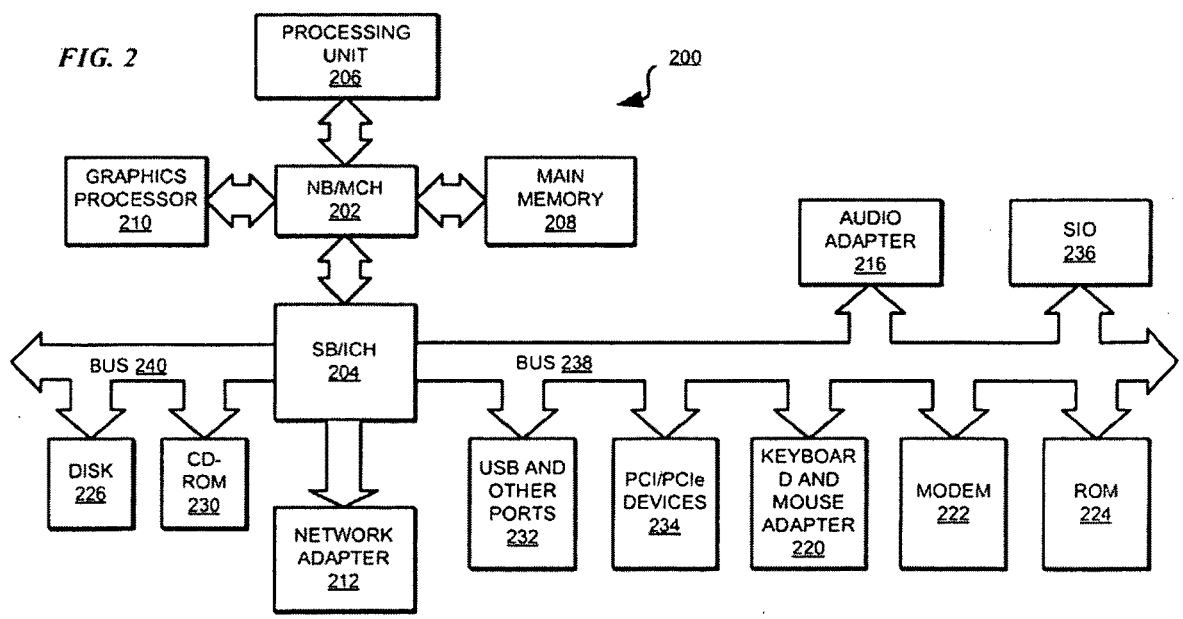
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. Server 106 may have a application 107, executing thereon. Application 107 may be a license manager, that is, a license management application. In the depicted example, client 110 may execute code 111. Code 111 may be marked according to the illustrative embodiments. Upon execution of code 111, the markings related to code 111 may report the execution to license manager application 107. Document 113 may be a report on the number of execution of code 111, utilization of IP asset associated with code 111, other information for similar purposes, or some combination thereof.

In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUS.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
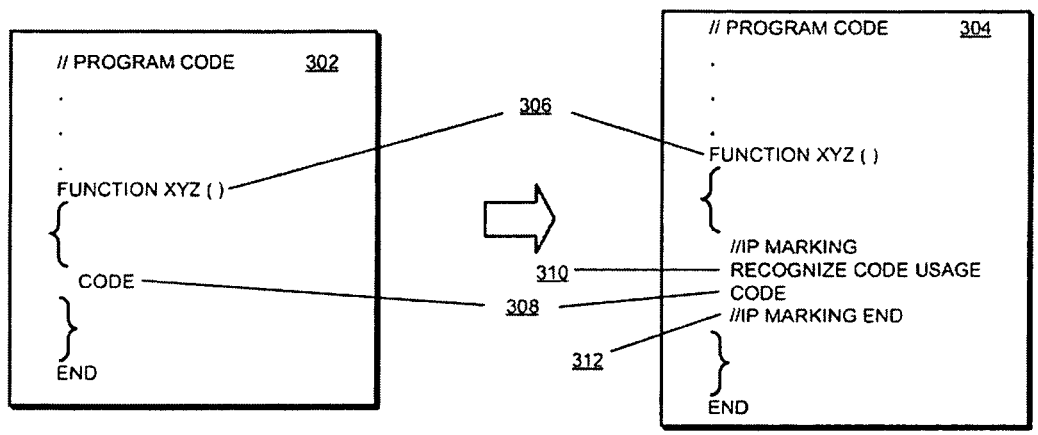
FIG. 3 depicts a block diagram of a program code marked in accordance with an illustrative embodiment.

With reference to FIG. 3, this figure depicts a block diagram of a program code marked in accordance with an illustrative embodiment. Code 302 may be code 111 in FIG. 1, in the presently used form, that is, without the illustrative embodiments. Code 304 may be code 111 in FIG. 1, but including the illustrative embodiments.

Code 302 is depicted as an example pseudo code that includes a function 306, function xyz( ). Function 306 includes code 308 that may be protected by a specific IP asset.

Code 304 is a modified form of code 302 and includes marking 310 according to an illustrative embodiment around code 308 of function 306 in code 304. Marking 310 may include IP information that may associate code 308 to specific IP assets. Marking 310 may be implemented as any suitable code for documenting the execution of code 308 in code 304. End 312 of marking 310 may be any suitable ending code, if needed, for implementing the code for marking 310.

Figure 4:
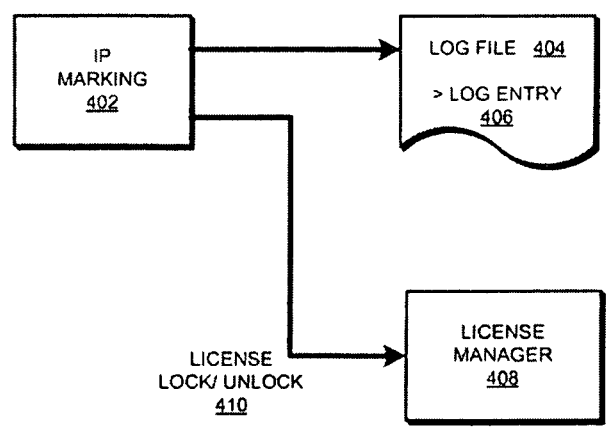
FIG. 4 depicts a block diagram of IP markings making example documentation code execution in accordance with an illustrative embodiment.

In principle, when function 306 in code 304 is executed, code for marking 310 and end 312 is also executed. Code for marking 310 may document the execution of code 308 in any manner suitable for a particular implementation of the illustrative embodiments. Some examples of this documentation are depicted in FIG. 4.

Code 308 and IP information of marking 310 may be identified and associated with each other using any technique suitable for an implementation. For example, information about the IP owned by a company may be stored in a repository, such as a database. Using patents as an example, such a repository may include patent numbers, summary description corresponding to each patent number, keywords associated with each patent number, and any other information useful in associating the patents with the relevant portions of program code or other documents. Similarly, the repository may include information about other types of IP assets, such as copyrights, trademarks, trade secrets, and licenses.

In one embodiment, a software programmer may insert comments in or around portions of a program code that the programmer may be writing or modifying. The comments may describe the functionality of the portion of the code. A software application or a component thereof, such as a software development tool, may match keywords in the comments to keywords in the repository of the information about the company's IP assets to identify any IP assets that may be relevant to that portion of the code. The tool may then recommend to the programmer that IP asset markings corresponding to those identified IP assets should be inserted at specific locations in the program code. Alternatively, the tool may automatically insert such markings.

In another embodiment, the software programmer may execute a search of the repository with words, phrases, symbols, and information relevant to the portion of the code the programmer may be manipulating. The repository may execute the search and provide a set of IP assets that may be relevant to the programmer's search. The programmer may then identify the IP assets that may be suitable for the code. The programmer may create markings around portions of the code using the identified IP assets.

In another embodiment, the programmer may write or modify portions of code according to certain guidelines. Other persons or software applications may scan the code to identify information that may be relevant to IP assets of the company. For example, a tool may scan a code for a certain regular expression. The tool may correlate any portion of the code that matches the regular expression search with certain search parameters. The tool may use the search parameters to identify relevant IP assets from a repository. The tool or another person or application may mark the portion of the code with the information about the identified IP asset.

These techniques for identifying code portions for IP protection, identifying corresponding IP assets, and marking the code portions with the information about those IP assets are described only as examples. These techniques are not limiting on the illustrative embodiments. Many other techniques for searching code, searching repositories, associating code with information in repositories, and creating markings according to the illustrative embodiments will be apparent from this disclosure. Such other techniques are contemplated within the scope of the illustrative embodiments.

With reference to FIG. 4, this figure depicts a block diagram of IP markings making example documentation code execution in accordance with an illustrative embodiment. IP marking 402 may be implemented as marking 310 in FIG. 3.

IP marking 402, may be executed in conjunction with the execution of a marked-up code, such as code 308 in FIG. 3. Upon execution, IP markings 402 may make an entry in log file 404, such as log file entry 406. Alternatively, or in conjunction with logging, IP markings 402 may also report code execution to license manager 408. For example, IP markings 402 may use lock and unlock functions 410 of license manager 408 to lock a license when the marked-up code is being executed, and unlock the locked license when the execution is complete.

The illustrative embodiments thus provide a mechanism for determining licensing needs and calculating license revenues owed based upon the number of executions of the IP protected code. In this manner, the illustrative embodiments allow for a more granular approach to licensing as compared to the presently used licensing models.

With reference to FIG. 5, this figure depicts a sample code including an example of IP markings in accordance with an illustrative embodiment. Code 500 may be implemented as code 304 in FIG. 3.

In the example code depicted as code 500 in this Figure, function 502 may be analogous to code 308 in FIG. 3. Function 502 may be protected by one or more IP assets. For example, markings 504 identify a United States patent by patent number, dates relevant to the patent, inventors of the subject matter of the patent, and a title of the patent. Of course, these aspects of the IP asset are only depicted as an example and are not intended to be limiting on the illustrative embodiments. A particular implementation of markings 504 may use additional, fewer, or different values to identify an IP asset without departing from the scope of the illustrative embodiments.

Furthermore, markings 504 may be distributed in more than one place with respect to the code segment that is associated with an IP asset. For example, markings 504 are one part of IP markings that identify the associated IP asset. Another part of the IP markings, markings 506, may be located in another place in code 500.

In the depicted example code 500, markings 506 invoke a call to a license manager and request a license. In order to so invoke a license manager call, code 508 may be further included in another location in code 500, and may operate in conjunction with markings 504 and 506.

In this example, marking 506 may operate to lock a license from a pool of licenses while function 502 executes. When function 502 has executed, markings 510, which may be analogous to end 312 in FIG. 3, may release the locked license.

In using a license manager, as the example of markings 506 does, the license manager may perform the function of documenting each execution of the protected code. For example, the license manager may create a record using the information from markings 504 and 506 to increment a count of executions of function 502.

In another embodiment, markings 506 may log a log entry into a log file. The log file entry may use the information of markings 504, markings 506, function 502, code 508, or some combination thereof to identify the IP asset that was utilized in the execution of function 502. Many other ways of tracking the execution of IP protected code will be apparent from this disclosure and the same are contemplated within the scope of the illustrative embodiments. For example,.an interface of a per-use royalty billing system may be called as a part of markings 506 and a billing entry may be made for each execution of function 502.

While the markings are described as corresponding to one or more patents associated with program code, such a use of markings is only an example and not limiting on the illustrative embodiments. Any markings according to the illustrative embodiments may correspond to any type of intellectual property rights, such as patents, copyrights, trade secrets, licenses, and any other form of contractual or statutory tools for intellectual property rights protection as may be available in particular jurisdictions.

For example, a marking according to the illustrative embodiments may correspond to a license to a marked section of a code that a company may have acquired from another company. As another example, a marking may correspond to a copyright on a portion of the program code, or other creative works embodied in a document. As another example, a marking may include information about an agreement to protect a trade secret, such as by licensing, cross-licensing, non-disclosure agreements, or other agreements.

Furthermore, the illustrative embodiments are applicable in implementations where a user may download, rent, lease, or otherwise acquire for use an entire program code or a part thereof. For example, a user may rent and download the code for an application from an application service provider (ASP). Markings according to the illustrative embodiments may be created to reflect the terms of the download, rent, lease, or other arrangement. Furthermore, such markings may be inserted in the code at the time of the download, or in advance of the download. The markings may be preprogrammed, conditioned upon the download activity, downloading user's preferences selected during the download, or a combination thereof.

Additionally, a marking according to the illustrative embodiments may itself be one or more lines of program code. A computer may be configured to execute the code of a marking in conjunction with or separate from the marked program code. For example, by executing the code of a marking in conjunction with the execution of a downloaded program code, a provider of the program code may restrict the execution of the marked code beyond a period of rent. As another example, executing the code of a marking may cause a verification of a license, a renewal of a license, a payment of a fee, a depletion of an account, or other actions. As another example, executing the code of a marking may insert a log entry into a log file documenting an execution of the marked code.

Figure 6:
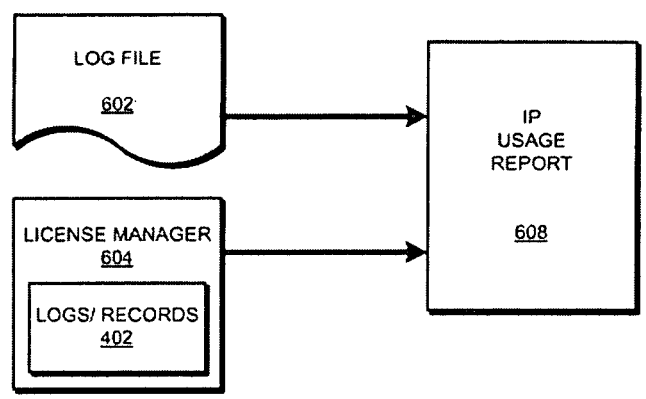
FIG. 6 depicts a block diagram of reporting IP asset usage in accordance with an illustrative embodiment.

With reference to FIG. 6, this figure depicts a block diagram of reporting IP asset usage in accordance with an illustrative embodiment. Log file 602 may be analogous to log file 404 in FIG. 4. Log file 602 may include log file entries as described with respect to FIG. 5.

The log file entries in log file 602 may log the execution of one or more portions of code that may be protected by one or more IP assets.

Similarly, license manager 604 may include logs or records 606 of similar executions. A particular implementation of the illustrative embodiments may use log file 602, license manager 604, another record keeping system, or some combination thereof for tracking the execution of IP protected code segments.

IP usage report 608 may be a report or another form of documentation generated from log file 602, logs and records 606 of license manager 604, and similar information from other sources. IP usage report 608 may inform an IP professional how certain IP assets are being utilized by licensees of certain products.

IP usage report 608, or log file 602, or another similar documentation may be transmitted from the location of the documentation to the IP professional. For example, the marked code may be executing in a customer's data processing environment, the customer having licensed the code from a manufacturer. The markings according to the illustrative embodiments embedded in the licensed code may create the log file, the report, or other comparable documentation at a location within the customer's data processing environment.

In one embodiment, the licensed code, the code for the markings, or a combination thereof may be programmed to transmit the log file or the report to the manufacturer from time to time. In another embodiment, the customer may be obligated to submit the log file or the report to the manufacturer. In another embodiment, the marked up code may execute in a customer's data processing environment, but the log file or the report may be created in the manufacturer's or a licensor's data processing system. In another embodiment, a third party's data processing system, such as an ASP, may collect the log files or reports from the customer's data processing environment.

These methods of enabling an IP professional's access to the log files, reports, or other similar documentation of the illustrative embodiments are only examples and not limiting on the illustrative embodiments. Many other methods of enabling such access will be apparent from this disclosure and the same are contemplated within the scope of the illustrative embodiments.

Figure 7:
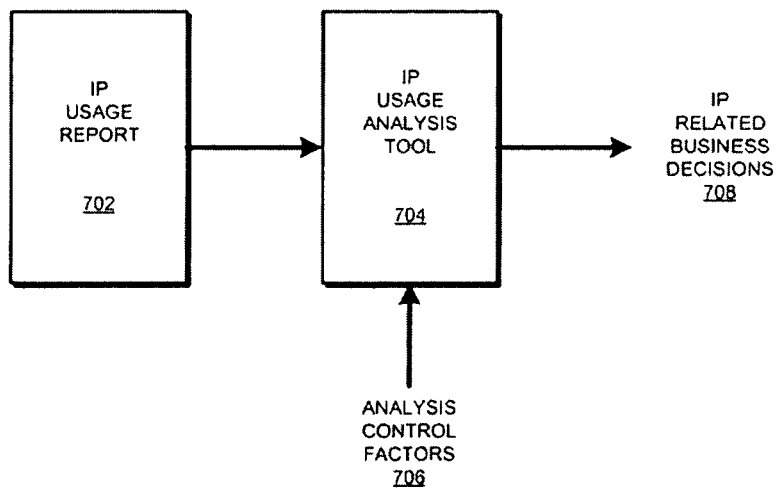
FIG. 7 depicts a block diagram of analyzing IP usage reports in accordance with an illustrative embodiment.

With reference to FIG. 7, this figure depicts a block diagram of analyzing IP usage reports in accordance with an illustrative embodiment. IP usage report 702 may be analogous to IP usage report 608 in FIG. 6.

IP usage report 702 may contain a number of entries. The number of entries in some cases may be in the thousands or higher. Furthermore, the entries may pertain to same or different segments of codes, being executed in connection with same or different products, in same or different data processing environments, by same or different users or processes. Thus, even though the IP usage information may be available in IP usage report 702, an IP professional may not find it easy to put that information to use.

IP usage analysis tool 704 may be an analytic application. IP usage analysis tool 704 may accept as an input IP usage report 702. IP usage analysis tool 704 may further accept zero or more analysis control factors 706. An analysis control factor is a parameter, attribute, consideration, key, or limitation in the analysis of data. For example, IP usage report 702 may be analyzed only in the context of a certain software product executing in a certain data processing system during a given window of time. The product name, the identification of the data processing system, and the time window may each be an analysis control factor in analysis control factors 706.

Some other examples of analysis control factors 706 may be as follows. In one embodiment, an IP professional may want to limit the analysis of IP usage report 702 to the usage of only a certain patent number. The patent number may be one analysis control factor. In another embodiment, the IP professional may want to examine IP usage report 702 for simultaneous usage of a set of patents. A set of patents is one or more patents. The set of patents may be another example of analysis control factors.

As another example, the IP professional may wish to isolate from IP usage report 702, those entries that show the utilization of a patent that is due to a payment of maintenance fee within a predetermined time. The patent number, and the predetermined time may be examples of analysis control factors. The analysis control factors 706 used here are only examples selected for the clarity of the description and are not limiting on the illustrative embodiments. Many other analysis control factors 706 will be apparent from this disclosure and the same are contemplated within the scope of the illustrative embodiments.

IP usage analysis tool 704 may compute and provide IP related business decisions 708. For example, an IP professional may wish to identify a set of patents related to a certain technological area that her employer may be pursuing. By accepting suitable analysis control factors 706, IP usage analysis tool may analyze IP usage report 702 and find that the set of patents is utilized below a threshold value of usage. IP usage analysis tool 704 may provide as IP related business decision 708 a recommendation that the technological area may not be provide desired returns on future investments.

In another case, a similar inquiry may result in IP related business decision 708 recommending further investment in the technological area and upkeep of existing IP assets in that technological area. Many other IP related business decisions 708 may be configured in specific implementations, such as by using appropriate sets of analysis control factors 706.

With reference to FIG. 8, this figure depicts a flowchart of a process of marking code segments associated with IP assets in accordance with an illustrative embodiment. Process 800 may be implemented in any software programming tool commonly used by software developers.

Process 800 begins by identifying an IP asset whose usage is to be determined (step 802). Process 800 locates one or more code segments in the overall code of a software application that may be covered by the identified IP asset (step 804).

Process 800 marks the located code segments with information that is usable to identify the IP asset (step 806). Any type and amount of identifying information may be used in step 806, including but not limited to the example depicted in FIG. 5.

Process 800 adds any code that may be needed for logging, recording, or otherwise tracking the execution of the code segments (step 808). Execution of the code segments correspond to the utilization of the IP asset identified in the markings. Process 800 ends thereafter.

With reference to FIG. 9, this figure depicts a flowchart of a process of detecting an IP asset usage in accordance with an illustrative embodiment. Process 900 may be implemented in any software application whose code has been marked as described in the illustrative embodiments, such as by using process 800 in FIG. 8.

Process 900 begins by executing a code that has been marked up as described with respect to FIGS. 3-5 and 8 (step 902). Process 900 recognizes a marking in the code (step 904). In some instances, recognizing a marking according to step 904 may be simply executing the code associated with the markings.

Process 900 records the execution of the marked-up code segment according to the markings (step 906). Step 906 may be performed by making log entries, reserving licenses, or making other records reflecting the use of IP assets associated with the marked-up code segments. When the marked-up code segment finishes executing (step 908). Process 900 ends thereafter.

With reference to FIG. 10, this figure depicts a flowchart of a process of analyzing IP asset usage in accordance with an illustrative embodiment. Process 1000 may be implemented in a data analysis tool, such as IP usage analysis tool 704 in FIG. 7.

Process 1000 begins by receiving code usage information (step 1002). For example, process 1000 may receive IP usage report 702 in FIG. 7 in step 1002. Process 1000 may also receive a set of analysis control factors (step 1004). For example, process 1000 may receive zero or more analysis control factors 706 in FIG. 7 in step 1006.

Process 1000 analyzes the code usage information received in step 1002 based on analysis control factors received in step 1004 (step 1006). In a particular implementation of process 1000, not receiving any analysis control factors in step 1004 may cause process 1000 to perform a default analysis in step 1006.

Process 1000 generates one or more business decisions, recommendations, suggestions, or other indicators based on the analysis (step 1008). Process 1000 ends thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for relating code with intellectual property assets. Using the illustrative embodiments, code segments can be specifically identified with specific IP assets. Presently, an entire product or component has to be associated with a set of IP assets and the entire bundle of IP assets has to be licensed together.

The illustrative embodiments allow a more granular licensing model as compared to the presently used licensing models. The illustrative embodiments facilitate tracking of usage of IP assets at the code segment level. The illustrative embodiments allow tracking execution of code segments and determining licensing terms based on the number of executions of the code segments.

Thus, according to the illustrative embodiments, licensing the entire bundle of IP assets with the entire product may not be necessary in some instances. Furthermore, learning which code segments execute most or least frequently in a product may highlight which IP assets may be preferred for ongoing or future IP rights related expenditures. Similarly, the same learning may also be useful in directing the software development programs and resources towards or away from certain technologies.

Furthermore, the IP markings according to the illustrative embodiments can be updated from time to time. The updates may reflect additional IP assets that may be acquired over time as the particular technology of specific code portions advances. Thus, valuable code segments can be identified and the protection over such portions of a product strengthened using the illustrative embodiments.

Additionally, sometimes the benefits of certain technologies may not be readily apparent. Code segments can be marked with information to associate them with specific IP assets, technological descriptions, and other similar information. Such markings may be useful for marketing and licensing those parts of the products when the relevant technology matures, becomes marketable, or otherwise bears indicators of profitability.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for relating code with intellectual property assets, the computer implemented method comprising:
   identifying an intellectual property asset;
   locating a portion of code from an entire code of a software application, the portion of code corresponding to the intellectual property asset;
   marking the portion of code with information identifying the intellectual property asset, wherein the marking invokes a license manager such that a license managed by the license manager for the portion of code is locked during execution of the portion of code;
   executing the portion of the code during the execution of the software application;
   recording the execution of the portion of code, the recording indicating a use of the intellectual property asset, the recording comprising:
      locking the license at the beginning of the execution of the portion of code;
      releasing the license at the conclusion of the execution; and
      logging a use of the license, the logging including the information identifying the intellectual property asset; and
   analyzing the recording according to a set of analysis control factors.

2. The computer implemented method of claim 1, wherein the software application is a component of a second software application, and wherein the portion is a plurality of portions.

3. The computer implemented method of claim 1, wherein the information identifying the intellectual property asset comprises:
   an intellectual property asset identifier; and
   a validity period of the intellectual property asset.

4. The computer implemented method of claim 1, wherein the recording comprises logging the execution of the portion of code the logging including the information identifying the intellectual property asset.

5. The computer implemented method of claim 1, wherein the recording includes recording the information identifying the intellectual property asset, wherein the intellectual property asset is a patent.

6. The computer implemented method of claim 1, further comprising:
   accepting the set of analysis control factors; and
   producing a recommendation for an intellectual property asset related business decision, wherein the business decision is to negotiate licensing terms for licensing the intellectual property asset based on the number of executions of the portion of code.

7. The computer implemented method of claim 1, further comprising:
   producing a recommendation for an intellectual property asset related business decision, wherein the business decision is one of (i) decision to invest in developing the technology related to the intellectual property asset, and (ii) decision to invest in maintaining the intellectual property asset.

8. The computer implemented method of claim 1, further comprising:
   modifying the marking associated with the portion of code with information identifying a second intellectual property asset associated with the portion of code.

9. A computer usable program product comprising a computer usable medium including computer usable code for relating code with intellectual property assets, the computer usable code comprising:
   computer usable code for identifying an intellectual property asset;
   computer usable code for locating a portion of code from an entire code of a software application, the portion of code corresponding to the intellectual property asset;
   computer usable code for marking the portion of code with information identifying the intellectual property asset, wherein the computer usable code for marking invokes a license manager such that a license managed by the license manager for the portion of code is locked during execution of the portion of code;
   computer usable code for executing the portion of the code during the execution of the software application;
   computer usable code for recording the execution of the portion of code, the recording indicating a use of the intellectual property asset, the computer usable code for recording comprising:
      computer usable code for locking the license at the beginning of the execution of the portion of code;

computer usable code for releasing the license at the conclusion of the execution; and computer usable code for logging a use of the license, the logging including the information identifying the intellectual property asset; and computer usable code for analyzing the recording according to a set of analysis control factors.

10. The computer usable program product of claim 9, wherein the software application is a component of a second software application, and wherein the portion is a plurality of portions.

11. The computer usable program product of claim 9, wherein the computer usable code for recording comprises computer usable code for logging the execution of the portion of code, the logging including the information identifying the intellectual property asset, wherein the intellectual property asset is a patent.

12. The computer usable program product of claim 9, further comprising:

computer usable code for accepting the set of analysis control factors; and computer usable code for producing a recommendation for an intellectual property asset related business decision, wherein the business decision is one of (i) decision to invest in developing the technology related to the intellectual property asset, and (ii) decision to invest in maintaining the intellectual property asset.

13. The computer usable program product of claim 9, further comprising:

computer usable code for modifying the marking associated with the portion of code with information identifying a second intellectual property asset associated with the portion of code.

14. A data processing system for relating code with intellectual property assets, the data processing system comprising:

a storage device including a storage medium, wherein the storage device stores computer usable program code; and a processor, wherein the processor executes the computer usable program code, and wherein the computer usable program code comprises:

computer usable code for identifying an intellectual property asset;

computer usable code for locating a portion of code from an entire code of a software application, the portion of code corresponding to the intellectual property asset, the portion being one of (i) a single portion and (ii) a plurality of portions;

computer usable code for marking the portion of code with information identifying the intellectual property asset, wherein the computer usable code for marking invokes a license manager such that a license managed by the license manager for the portion of code is locked during execution of the portion of code;

computer usable code for executing the portion of the code during the execution of the software application;

computer usable code for recording the execution of the portion of code, the recording indicating a use of the intellectual property asset, the computer usable code for recording comprising:

computer usable code for locking the license at the beginning of the execution of the portion of code;

computer usable code for releasing the license at the conclusion of the execution; and computer usable code for logging a use of the license, the logging including the information identifying the intellectual property asset; and computer usable code for analyzing the recording according to a set of analysis control factors.

15. The data processing system of claim 14, wherein the recording includes recording the information identifying the intellectual property asset, wherein the intellectual property asset is a patent.

16. The data processing system of claim 14, further comprising:

computer usable code for accepting the set of analysis control factors; and computer usable code for producing a recommendation for an intellectual property asset related business decision, wherein the business decision is one of (i) decision to invest in developing the technology related to the intellectual property asset, and (ii) decision to invest in maintaining the intellectual property asset.

17. The data processing system of claim 14, further comprising:

computer usable code for modifying the marking associated with the portion of code with information identifying a second intellectual property asset associated with the portion of code.

* * * * *